United States Patent
Bahrami et al.

(10) Patent No.: US 11,150,955 B2
(45) Date of Patent: Oct. 19, 2021

(54) GENERATION AND USAGE OF A TASK-BASED PROGRAMMING PLATFORM

(71) Applicant: FUJITSU LIMITED, Kawasaki (JP)

(72) Inventors: Mehdi Bahrami, Santa Clara, CA (US); Wei-Peng Chen, Fremont, CA (US)

(73) Assignee: FUJITSU LIMITED, Kawasaki (JP)

( * ) Notice: Subject to any disclaimer, the term of this patent is extended or adjusted under 35 U.S.C. 154(b) by 129 days.

(21) Appl. No.: 16/745,269

(22) Filed: Jan. 16, 2020

(65) Prior Publication Data

US 2021/0224126 A1    Jul. 22, 2021

(51) Int. Cl.
  *G06F 9/46* (2006.01)
  *G06F 9/50* (2006.01)
  *G06F 9/48* (2006.01)

(52) U.S. Cl.
  CPC .......... *G06F 9/5038* (2013.01); *G06F 9/4831* (2013.01); *G06F 9/4843* (2013.01)

(58) Field of Classification Search
  CPC ..... G06F 9/5038; G06F 9/4831; G06F 9/4843
  See application file for complete search history.

(56) References Cited

U.S. PATENT DOCUMENTS

| | | | |
|---|---|---|---|
| 6,127,954 A | 10/2000 | Kim | |
| 8,983,547 B2 | 3/2015 | Jeong et al. | |
| 10,019,238 B2 | 7/2018 | Patino-Bueno et al. | |
| 10,169,004 B2 | 1/2019 | Bolling et al. | |
| 10,216,494 B2 | 2/2019 | Stachura | |
| 10,423,392 B2 | 9/2019 | Bricklin | |
| 2019/0347077 A1* | 11/2019 | Huebra | G06F 16/22 |

\* cited by examiner

*Primary Examiner* — Diem K Cao
(74) *Attorney, Agent, or Firm* — Maschoff Brennan

(57) ABSTRACT

A method may include obtaining a specification for a resource that includes a description of how the resource operates and interacts with another resource. The method may include generating a diagram that includes each word in the description in an order of word types. The method may include generating a second specification that includes the description and the diagram. The method may include generating tasks for the resource. Each task may include a description based on the description of the resource and diagram. The method may include generating hierarchy descriptions for each task based on the task descriptions. The method may include creating a model for each task that includes the hierarchy descriptions for the corresponding task. The hierarchy descriptions may be arranged according to the diagram in the second specification. The method may include presenting one of the hierarchy descriptions for the tasks according to the models.

20 Claims, 12 Drawing Sheets

```
▼ {
      name: "skipCount",
      in: "query",
      description: "The skip count, which specifies the number of elements that can
      be bypassed from a sequence and then return the remaining elements.",
      required: false,
      type: "integer"
▼ },
  {
      name: "takeCount",
      in: "query",
      description: "The take count, which specifies the number of elements that can
      be returned from a sequence.",
      required: false,
   ▼  type: "integer"
  },
  {
      $ref: "d/parameters/apiVersionParameter"
▼ }
  ], ▼
  responses: {
      "200": {
          description: "The list of Active Directory Domain Controller services.",
          schema: {
              $ref: "#/definitions/Services"
          }
   ▼ ▼ }
  },
  x-ms-pageable: {
▼     nextLinkName: "nextLink"
  }, ▼
  "x-concept.endpoint_description": {
      [
          "details",
       ▼  2
518─      ],
          [
              "active",
       ▼      9
          ],
          [
              "directory",
       ▼      2
520─      ],
          [
              "domain",
              2
          ]
```

*FIG. 5*

```
post:
    x-tasks:
        - name: Add values in one or more cells.
          parameters:
            - in: body
              name: body
              schema:
                $ref: '#/definitions/RequestAppendCells'
            - description: The spreadsheet to apply the updates to.
              in: path
              name: spreadsheetId
              required: true
              type: string
        - name: Update values in one or more cells.
          parameters:
            - in: body
              name: body
              schema:
                $ref: '#/definitions/RequestUpdateCells'
            - description: The spreadsheet to apply the updates to.
              in: path
              name: spreadsheetId
              required: true
              type: string
```

FIG. 6

```
x-tasks:
    -Title: <title of x-task and it definition>
        x-concepts
832         servers
            host
            endpoint
                http_verb
                    parameters(input):
                        - in: <body | header | query | path>

- name:
                        - type: string
834

.... (other features of parameters from OAS3 schema: <output>
                    $ref: '#/definitions/add1'
                        - description:
                        - in:  <body | header | query | path>
                        - name:
836                     - required: true | false
                        - type: string
```

*FIG. 8*

GENERATION AND USAGE OF A TASK-BASED PROGRAMMING PLATFORM

FIELD

The embodiments discussed in the present disclosure are related to generation of a task-based programming environment.

BACKGROUND

Knowledge regarding programming languages and/or software engineering may be beneficial to create software programs. However, many users without extensive knowledge of programming languages and/or software engineering (e.g., citizen developers) may choose to generate software programs.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

One or more embodiments of the present disclosure may include a method that includes obtaining a resource specification for a computation resource. The resource specification may include a description of how the computation resource operates and how the computation resource interacts with another computation resource. The method may also include generating a diagram. The diagram may include each word in the description. The words in the diagram may be arranged in a hierarchy order of word types. The diagram may indicate relationships between the words. Additionally, the method may include generating a second resource specification. The second resource specification may include the description and the diagram. Furthermore, the method may include generating one or more tasks for the computation resource. Each task may include a task description based on the description of the computation resource and the diagram. The method may include generating hierarchy descriptions for each task. The hierarchy descriptions may be generated based on the task description for each corresponding task. The method may also include creating a hierarchy model for each task. Each hierarchy model may include the hierarchy descriptions for the corresponding task. In addition, the hierarchy descriptions in the hierarchy models may be arranged according to the diagram in the second resource specification. Furthermore, the method may include presenting, via a device, one of the hierarchy descriptions for the tasks according to the hierarchy models.

The object and advantages of the embodiments will be realized and achieved at least by the elements, features, and combinations particularly pointed out in the claims. Both the foregoing general description and the following detailed description are exemplary and explanatory and are not restrictive.

BRIEF DESCRIPTION OF THE DRAWINGS

Example embodiments will be described and explained with additional specificity and detail through the use of the accompanying drawings in which:

FIG. 5 illustrates a screen shot of an example second specification that may be implemented in the operating environment of FIG. 1;

FIG. 6 illustrates a screen shot of example tasks that may be generated in the operating environment of FIG. 1;

FIG. 8 illustrates a screen shot of an example task schema that may be implemented in the operating environment of FIG. 1;

DETAILED DESCRIPTION

Figure 1:
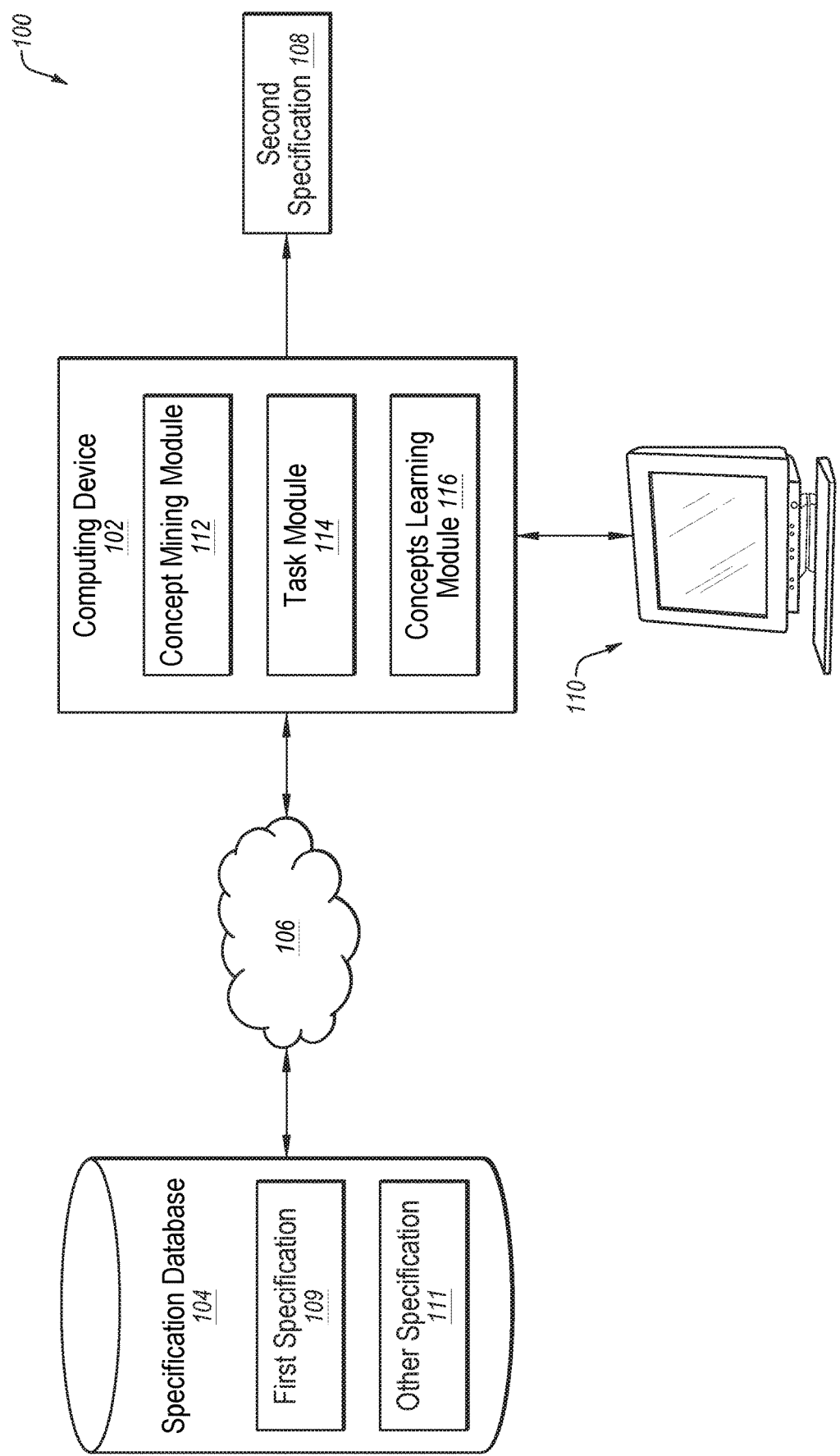
FIG. 1 is a block diagram of an example operational environment to generate a task-based programming environment.

As discussed above, users without extensive knowledge of programming languages and/or software engineering (e.g., citizen developers) may choose to generate software programs. Some programming environments (e.g., programming platforms) may not include options for these users to easily generate software programs. For example, some programming technologies may not provide descriptions or information regarding various functions that may be created using the programming environments. As another example, some programming technologies may not include descriptions or information regarding the various functions in a form that is easily understood by the users (e.g., may include industry jargon, complex terms, etc.). In addition, some programming technologies may not be configured to access resource specifications to generate the actual programming environment. Therefore, these software technologies may create programming environments that are difficult for these users to use and to create software programs.

According to at least one embodiment described in the present disclosure, a resource specification may be used as input to generate a task-based programming environment. In addition, according to at least one embodiment described in the present disclosure the task-based environment may be readily understood and used by users that do not have extensive knowledge of programming languages and/or software engineering. In some embodiments, the resource specification may include multiple descriptions of how different computation resource (generally referred to in the present disclosure as "computation resources") operate and how the computation resources interact with additional computation resources. The computation resources may include one or more resource endpoints, resource databases, resource devices, and micro-services. In the resource databases an action may be performed, and a value may be returned. In the resource devices a device may perform an action and return a value and/or reaction. In the resource micro-services, a computation or an action may be performed and a one or more value and/or reactions may be returned. In addition, the resource specification may include required and/or optional parameters for communicating using the computation resources. Further, the resource specification may include schema for each computation resource. A diagram may be generated for each description in the resource specification. The diagrams may include each word from the corresponding description arranged in a hierarchy order based on word types. In addition, the diagram may indicate relationships between the different words. In some embodiments, the diagram may include a semantic definition of the descriptions.

In some embodiments, a second resource specification (e.g., an enriched resource specification) may be generated for the computation resource. The second resource specification may include the descriptions of the computation resources, the parameters, the schema, and the diagrams. One or more tasks may be generated for each of the computation resources. Each task may be directed to a different function and/or level of functionality of the corresponding computation resource (e.g., the tasks may be directed to different inputs, outputs, and/or parameters of the computation resource). For example, for a retrieve email computation resource, the generated tasks may include retrieving a most recently sent email, retrieving a particular number of recently sent emails, and retrieving emails that were sent during a particular period of time. Each task may include a task description that is based on the corresponding descriptions of the computation resources and the corresponding diagrams. The task descriptions may include a concept keyword from the corresponding descriptions and a ranking of the concept keyword based on the diagrams (e.g., based on the hierarchy of order based on word types).

Multiple hierarchy descriptions for each task may be generated based on the task description of the corresponding task. Each of the hierarchy descriptions may describe the functionality of the corresponding task according to a different layer (e.g., level of abstraction). For example, the hierarchy descriptions for the retrieve email computation resource may include "get last email," "get last N number of emails," and "get emails from the last week." A hierarchy model may be created for each task. The hierarchy models may include each of the hierarchy descriptions for the corresponding task. In addition, the hierarchy model may include the hierarchy descriptions arranged according to the diagram.

In some embodiments, one or more hierarchy descriptions may be presented via a GUI displayed on a device (e.g., a display screen). An order of the presentation of the hierarchy descriptions may be based on the hierarchy models. In some embodiments, a software engineer and/or a system may define micro-functions using the different tasks. The task-based programming environment (e.g., task-based programming platform) may be generated to include the micro functions. The user may access the micro functions via the task-based programming environment and generate a software program by combining the micro functions in various orders. In some embodiments, the micro functions may each be used as stand-alone software programs. In other embodiments, the micro functions may be combined by the user within the task-based programming environment to generate different software programs.

At least one embodiment described in the present disclosure may permit the user to generate software programs with limited or no knowledge of programming languages or software engineering. In addition, the micro-functions may be generated at different layers of abstraction (granularity levels) to allow the user to select different levels of resources are to be used in the software program.

These and other embodiments of the present disclosure will be explained with reference to the accompanying figures. It is to be understood that the figures are diagrammatic and schematic representations of such example embodiments, and are not limiting, nor are they necessarily drawn to scale. In the figures, features with like numbers indicate like structure and function unless described otherwise.

FIG. 1 is a block diagram of an example operational environment 100 to generate a task-based programming environment, in accordance with at least one embodiment described in the present disclosure. The operational environment 100 may include a specification database 104, a network 106, a computing device 102, and a display screen 110.

The network 106 may include any communication network configured for communication of signals between any of the components (e.g., 102 and 104) of the operating environment 100. The network 106 may be wired or wireless. The network 106 may have numerous configurations including a star configuration, a token ring configuration, or another suitable configuration. Furthermore, the network 106 may include a local area network (LAN), a wide area network (WAN) (e.g., the Internet), and/or other interconnected data paths across which multiple devices may communicate. In some embodiments, the network 106 may include a peer-to-peer network. The network 106 may also be coupled to or include portions of a telecommunications network that may enable communication of data in a variety of different communication protocols.

In some embodiments, the network 106 includes or is configured to include a BLUETOOTH® communication network, a Z-Wave® communication network, an Insteon® communication network, an EnOcean® communication network, a Wi-Fi communication network, a ZigBee communication network, a HomePlug communication network, a Power-line Communication (PLC) communication network, a message queue telemetry transport (MQTT) communication network, a MQTT-sensor (MQTT-S) communication network, a constrained application protocol (CoAP) communication network, a representative state transfer application protocol interface (REST API) communication network, an extensible messaging and presence protocol (XMPP) communication network, a cellular communication network, any similar communication networks, or any combination thereof for sending and receiving data. The data communicated in the network 106 may include data communicated via short messaging service (SMS), multimedia messaging service (MMS), hypertext transfer protocol (HTTP), direct data connection, wireless application protocol (WAP), e-mail, smart energy profile (SEP), ECHONET Lite, OpenADR, or any other protocol that may be implemented with specification database 104.

The specification database 104 may include any memory or data storage, which may be similar to a memory 1250 discussed elsewhere in the present disclosure. The specification database 104 may include network communication capabilities such that other components in the operating environment 100 may communicate with the specification database 104. The specification database 104 may be configured to store various data. For example, the specification database 104 may store resource specifications (e.g., a first specification 109 and an other specification 111). The specification database 104 may include any computer-based or hardware-based computing system.

The first specification 109 and the other specification 111 may describe resources including computation resources. In some embodiments, the first specification 109 and/or the other specification 111 may include application programming interface (API) specifications. In these and other embodiments, the first specification 109 and the other specification 111 may be formatted according to an OpenAPI Specification (OAS) format and/or other similar formats. The first specification 109 and the other specification 111 may include different parameters, descriptions, and schemas directed to the same or similar resources. In some embodiments, the parameters may include input and output variables associated with the corresponding computation resource. In these and other embodiments, the schema may include features and/or structures of how the corresponding computation resource is represented. Additionally or alternatively, the description may include a summary of the corresponding computation resource and a functionality of the corresponding computation resource. In some embodiments, the first specification 109 may be prepared, stored, or otherwise maintained by an entity associated with the corresponding resource. In addition, in some embodiments, the first specification 109 may be prepared, stored, or otherwise maintained by the entity associated with the corresponding resource and the other specification 111 may be prepared, stored, or otherwise maintained by a different entity. The other specification 111 may be configured to provide a point of comparison for the first specification 109. Example parameters may include "count," "select,", and "message." The descriptions may indicate how the computation resources operate. In addition, the descriptions may indicate how the computation resources interact with additional computation resources.

The computing device 102 may include a concept mining module 112, a task module 114, and a concept learning module 116. The concept mining module 112, the task module 114, and the concept learning module 116 may be configured to implement steps and processes associated with obtaining and processing the first specification 109 and/or the other specification 111 to generate a second specification 108 and/or a task-based programming environment.

The concept mining module 112 may include code and routines configured to enable the computing device 102 to perform one or more operations with respect to receiving and processing the first specification 109 and/or generating the second specification 108. Additionally or alternatively, the concept mining module 112 may be implemented using hardware including a processor, a microprocessor (e.g., to perform or control performance of one or more operations), a field-programmable gate array (FPGA), or an application-specific integrated circuit (ASIC). In some other instances, the concept mining module 112 may be implemented using a combination of hardware and software. In the present disclosure, operations described as being performed by the concept mining module 112 may include operations that the concept mining module 112 may direct a corresponding system to perform.

The task module 114 may include code and routines configured to enable the computing device 102 to perform one or more operations with respect to generating tasks based on the second specification 108 and/or the other specification 111. Additionally or alternatively, the task module 114 may be implemented using hardware including a processor, a microprocessor (e.g., to perform or control performance of one or more operations), a field-programmable gate array (FPGA), or an application-specific integrated circuit (ASIC). In some other instances, the task module 114 may be implemented using a combination of hardware and software. In the present disclosure, operations described as being performed by the task module 114 may include operations that the task module 114 may direct a corresponding system to perform.

The concept learning module 116 may include code and routines configured to enable the computing device 102 to perform one or more operations with respect to generating the task-based programming environment. Additionally or alternatively, the concept learning module 116 may be implemented using hardware including a processor, a microprocessor (e.g., to perform or control performance of one or more operations), a field-programmable gate array (FPGA), or an application-specific integrated circuit (ASIC). In some other instances, the concept learning module 116 may be implemented using a combination of hardware and software. In the present disclosure, operations described as being performed by the concept learning module 116 may include operations that the concept learning module 116 may direct a corresponding system to perform.

The computing device 102 (e.g., the concept mining module 112, the task module 114, and the concept learning module 116) may be implemented to generate descriptions of the first specification 109 in different semantic understanding levels to generate the task-based programming environment for the user. The concept mining module 112 may obtain the first specification 109 from the specification database 104.

In some embodiments, the concept mining module 112 may operate as a constituency parser and perform semantic analysis of the description of a computation resource. In these and other embodiments, the concept mining module 112 may parse each word in the description according to word types. A word type of each word of the description may be identified, and the description may be restructured according to a hierarchy order of the word types. For example, an example description of a computation resource may be "Endpoint1 updates database." The concept mining module 112 may assign the word "updates" as a higher priority word in comparison to the words "Endpoint1" and "database" because the word "updates" is a main functionality of the resource description. The concept mining module 112 may assign the word "Endpoint1" a higher priority than the word "database" because the word "Endpoint1" may be identified as an actor. Further, the concept mining module 112 may assign the word "database" the lowest priority because the word "database" may be identified as the noun that is being acted upon by the noun actor. In some embodiments, the concept mining module 112 may be configured to extract the concept of the description. In some embodiments, the concept mining module 112 may perform the semantic analysis (e.g., parsing each of the words in the description) according to a Berner Model or other similar model.

In some embodiments, the concept mining module 112 may generate a diagram (e.g., a concept tree) of the words in the description according to the hierarchy order of word types. In addition, the diagram may indicate relationships (e.g., actor, object, location, etc.) between each of the words in the description. In some embodiments, the diagram may be generated using topic modeling. In these and other embodiments, the diagram may be generated using Latent Dirichlet Allocation or other similar approach. An example description may be "Creates a spreadsheet, returning the newly created spreadsheet." For this example description, the diagram may include the following:

```
(S
    (VP
        (VBZ Creates)
        (NP (DT a) (NN Spreadsheet))
        (, ,)
        (S
            (VP
                (VBG returning)
                (NP
                    (DT the)
                    (ADJP (RB newly) (VBN created))
                    (NN spreadsheet)))))
    (. .))
```

In this example, the word "Creates" may be assigned the highest priority and the word "spreadsheet" may be assigned the lowest priority. Another example description may be "The ID of the spreadsheet to update." For this example description, the diagram may include the following:

```
(NP
    (NP (DT The) (NN ID))
    (PP (IN of) (NP (DT the) (NN spreadsheet)))
    (SBAR (S (VP (TO to) (VP (VB update))))))
    (. .))
```

In this example, the word "ID" may be assigned the highest priority and the word "update" may be assigned the lowest priority. Yet another example description may be "The A1 notation of a range to search for a logical table of data. Values will be appended after the last row of the table." For this example description, the diagram may include following:

```
(S
    (NP
        (NP (DT The) (CD A1) (NN notation))
        (PP
            (IN of)
            (NP
                (NP (DT a) (NN range))
                (SBAR
                    (S
                        (VP
                            (TO to)
                            (VP
                                (VB search)
                                (PP
                                    (IN for)
                                    (NP
                                        (N) (DT a) (JJ logical) (NN table))
                                        (PP (IN of)
                                            (NP       (NNS data)))))))))))
    (: .)
    (S
        (NP (NNS Values))
        (VP
            (MD will)
            (VP
                (VB be)
                (VP
                    (VBN appended)
                    (PP
                        (IN after)
```

```
                        (NP
                            (NP (DT the) (JJ last) (NN row))
                            (PP (IN of) (NP (DT the) (NN table))))))))))
    (. .))
```

In this example, the word "A1" may be assigned the highest priority and the word "table" may be assigned the lowest priority. In the examples discussed above, ADJP may represent an adjective phrase; CD may represent a cardinal number; DT may represent a determiner; IN may represent a preposition or subordinating conjunction; JJ may represent an adjective; MD may represent a modal; N may represent a common noun; NN may represent a noun, singular or mass; NNS may represent a noun plural; NP may represent a noun phrase; PP may represent a prepositional phrase; RB may represent an adverb; S may represent a declarative clause; SBAR may represent a clause introduced by a subordinating conjunction; TO may represent the word "to;" VB may represent a verb, base form; VBG may represent a verb, gerund or present participle; VBN may represent a verb, past participle; VBZ may represent a Verb, 3rd person singular present; and VP may represent a verb phrase.

In some embodiments, the concept mining module 112 may identify a concept keyword of the description. The concept keyword may be a keyword that is associated with an overarching item, functionality, or action of the computation resource. For example, for the description "Creates a spreadsheet, returning the newly created spreadsheet," the concept keyword may be identified as "spreadsheet." In addition, in embodiments in which the first specification includes multiple descriptions, keywords may be extracted from each description and the concept mining module 112 may determine a ranking of each concept keyword based on the location of the concept keywords in the corresponding diagrams that includes the concept keywords. For example, the concept keyword "spreadsheet" may include a ranking of two when the word "spreadsheet" is on a second row of the corresponding diagram. The diagram may also include the concept keyword and the corresponding ranking. In addition, the term "spreadsheet" can be replaced with a placeholder that defines the term "spreadsheet" in a generic definition such that "program" can be used as a generic term for "spreadsheet". By replacing the term "spreadsheet" with "program", the resource may be accessed either by using "update spreadsheet" or by using "update program". In some embodiments, the concept keywords rankings may be mapped to different layers based on a location of the corresponding keywords in corresponding diagrams.

The concept mining module 112 may determine hypernyms for one or more nouns in the description. In some embodiments, the concept mining module 112 may determine the hypernyms for nouns in the description according to a WordNet Model. The concept mining module 112 may extract the nouns from the description and find the corresponding hypernyms of the nouns. In addition, the concept mining module 112 may generate one or more generic descriptions for the computation resource using the hypernyms instead of the nouns. For example, an example description may be "Add a value to a spreadsheet." The concept mining module 112 may parse the description as discussed above. In addition, the concept mining module 112 may extract the noun "spreadsheet" from the description and determine a hypernym for it. The hypernym for the noun "spreadsheet" may be determined to be "program" and the generic description may be "Add a value to a program." In some embodiments, the hypernyms to be used in place of the nouns in the description may be determined based on a hypernym hierarchy model. Different levels of hypernyms may be selected and used in the generic descriptions.

The concept mining module 112 may generate the second specification 108. In some embodiments, the second specification 108 may include additional information describing the corresponding resource compared to the first specification 109. In these and other embodiments, the second specification 108 may include the diagram in addition to the description, the schema, and the parameters from the first specification 109. In these and other embodiments, the diagram in the second specification 108 may include the concept keywords and corresponding rankings. In addition, in some embodiments, the second specification 108 may include each generic description that was generated in addition to the description, the schema, the parameters from the first specification 109. In some embodiments, the second specification 108 may include everything from the first specification 109 and the mined information generated by the concept mining module 112. An example second specification is illustrated in FIG. 5.

The task module 114 may receive the second specification 108 and generate one or more tasks for the computation resource. In some embodiments, the tasks may include an abstract model of computation associated with the resource. For example, the resource may be directed to "accessing email" and a task may be directed to "reading last email" and another task may be directed to "reading last ten emails." In these and other embodiments, the tasks may be homomorphic versions of the resource (e.g., the original computation resource) using different and/or similar input and/or output parameters. The tasks may be generated based on the schema, the description, the parameters, the diagram, the concept keywords and the corresponding rankings, and/or the generic descriptions. Each of the tasks may be directed to different functions and/or parameters of the computation resource. In some embodiments, a task may be generated for each functionality, required and/or optional input parameter, and different types of output parameters of the computation resource. For example, a different task may be generated for each hyper text transfer protocol verb in the description. An example description may include "Adding and updating a value in a spreadsheet." The concept mining module 112 may process this example description as discussed above and the task module 114 may generate two tasks for this example description. A first task may be "adding values to one or more cells" and a second task may be "updating values in one or more cells."

In addition, the task module 114 may generate a task description for each task according to the corresponding structure of the tasks (e.g., "adding values to one or more cells" and "updating values in one or more cells"). In some embodiments, the task descriptions may describe one or more possible homomorphic versions of the resource for different permutations of input parameters and/or output parameters for the corresponding resource. The task descriptions may be based on the description, the schema, the parameters, the diagram, the concept keywords, and/or the generic description. In some embodiments, the task description may be generated using specific words from the description, parameters, and/or schema from the description in the first specification 108. In these and other embodiments, the task descriptions may include one or more parameters and/or one or more schema from the description that are used for the task. An example task description may be "Use outlook Microsoft email API to get messages from me by retrieving the total count of matching resources." In this example task description, "Use outlook Microsoft email API" may identify an API associated with the task, "to get messages from me" may identify the computation resource the API is associated with the task, and "by retrieving the total count of matching resources" may identify the parameters that are associated with the task. An additional example task description is illustrated in FIG. 6.

In some embodiments, the task module 114 may automatically verify the tasks that are generated by the task module 114. In these and other embodiments, a call to an associated computation resource may be performed using the parameters associated with the task. For example, a call to the messages from the computation resource of the Microsoft email API may be made to retrieve the total count of matching emails (e.g., resources).

In some embodiments, the task module 114 may generate a task list (e.g., a common task list) that includes the tasks for the first specification 109 in a commonality order. In these and other embodiments, the task module 114 may determine the commonality order using the other specification 111. In some embodiments, the other specification 111 may include a list of tasks and how many times a particular user uses each task or how many times each task is used by multiple users. In these and other embodiments, the task module 114 may compare each task to the tasks for the other specification 111 and determine the commonality order based on whether the tasks for the first specification 109 are used more than other tasks for the first specification 109.

In some embodiments, the task module may generate tasks for the other specification 111 in the same or similar manner as the tasks for the first specification 109. The task module 114 may compare each task generated for the first specification 109 to each task generated for the other specification 111. If a particular task for the first specification 109 is the same as or similar to one or more tasks for the other specification 111, the task module 114 may identify the particular task as a common task. In some embodiments, the task module 114 may determine the commonality order based on a similarity between the corresponding tasks and one or more tasks for the other specification 111.

In some embodiments, the task module 114 may be configured to compare parameters of the tasks for the first specification 109 to parameters of the tasks for the other specification 111. If a task for the first specification 109 includes one or more parameters that are the same as or similar to parameters of the tasks for the other specification 111, the task module 114 may determine the corresponding task is a common task. An example of adding the tasks for the first specification 109 (e.g., a selected task) to the task list is discussed in more detail below in relation to FIG. 3.

The concept learning module 116 may receive the task list from the task module 114. The concept learning module 116 may be configured to generate multiple hierarchy descriptions for each task in the task list based on the task descriptions. Each hierarchy description may describe the corresponding task at a different layer (e.g., different abstract layers such as an idea layer or an implementation layer) of functionality. For example, the hierarchy descriptions for a retrieve email task (e.g., a task generated based on a generic description) may include "retrieve emails," "retrieve sent email," "retrieve received emails," "retrieve emails sent last week," and "retrieve emails received last week." In this example, the hierarchy description "retrieve emails" may be the broadest and the hierarchy descriptions "retrieve emails sent last week" and "retrieve emails received last week" may be the narrowest. In some embodiments, the concept learning module 116 may abstract information corresponding to the computation resource to generate the broader and the narrower hierarchy descriptions.

In some embodiments, the concept learning module 116 may implement semantic role labelling (SRL) to generate the hierarchy descriptions. SRL may identify a predicate and argument structure of the task descriptions. For example, an example task description may include "The name displayed in the address book for the user" and the word "displayed" may be identified as the verb, the "The name" and "in the address book" may be identified as different arguments, and "for the user" may be identified as the modifier. The concept learning module 116 may map the different portions of the task description to different layers.

In addition, the concept learning module 116 may generate a hierarchy model for each task. In some embodiments, the hierarchy model for each task may include the hierarchy descriptions arranged in an order based on the order of words of the description in the diagram. In these and other embodiments, an order of the hierarchy descriptions in the hierarchy models may be based on a position of one or more words of the hierarchy descriptions in the corresponding diagrams. In other embodiments, the hierarchy model for each task may include the hierarchy descriptions arranged in an order based on the level to which the hierarchy descriptions were abstracted.

The concept learning module 116 may direct presentation of the hierarchy descriptions via the GUI on the display screen 110. In some embodiments, the concept learning module 116 may direct presentation of the hierarchy descriptions based on the hierarchy model. For example, the concept learning module 116 may display the broadest hierarchy description of the common tasks first. As another example, the concept learning module 116 may display the hierarchy descriptions according to the ranking of corresponding keywords.

In some embodiments, a software engineer (SE) user may use the GUI and the generated tasks to cause the task-based programming environment to be generated by the concept learning module 116. In these and other embodiments, the SE user may provide input (e.g., select a task, drag the task to a field, and drop the task in the field) via the GUI effective to select one or more tasks that are to be included in the task-based programming environment (e.g., define context of the task-based programming environment). In some embodiments, the concept learning module 116 may generate the task-based programming environment using the generated tasks. In these and other embodiments, the concept learning module 116 may identify one or more tasks that are to be included in the task-based programming environment.

The concept learning module 116 may identify parameters, schema, tasks, descriptions, generic descriptions, and any other type of information associated with the selected tasks. In addition, the concept learning module 116 may associate the parameters and/or schema of the different selected tasks with each other (e.g., may generate connections between the different selected tasks).

In some embodiments, the concept learning module 116 may generate micro functions based on the selected tasks. In these and other embodiments, the micro-functions may include code and data for actually performing the selected tasks. In some embodiments, the micro-functions may be generated based on the hierarchy descriptions corresponding to the selected tasks. The micro-functions may include code configured to cause the computing device 102 or another device to perform the corresponding tasks.

The concept learning module 116 may direct presentation of the task-based programming environment via an additional GUI on the display screen 110. In some embodiments, the task-based programming environment may include the micro-functions in a format that the user may select. The user may select one or more micro functions and indicate what information (e.g., data) is to be used to perform the micro functions. The concept learning module 116 may generate script code to call the micro functions without the user providing any programming specific input.

Figure 2:
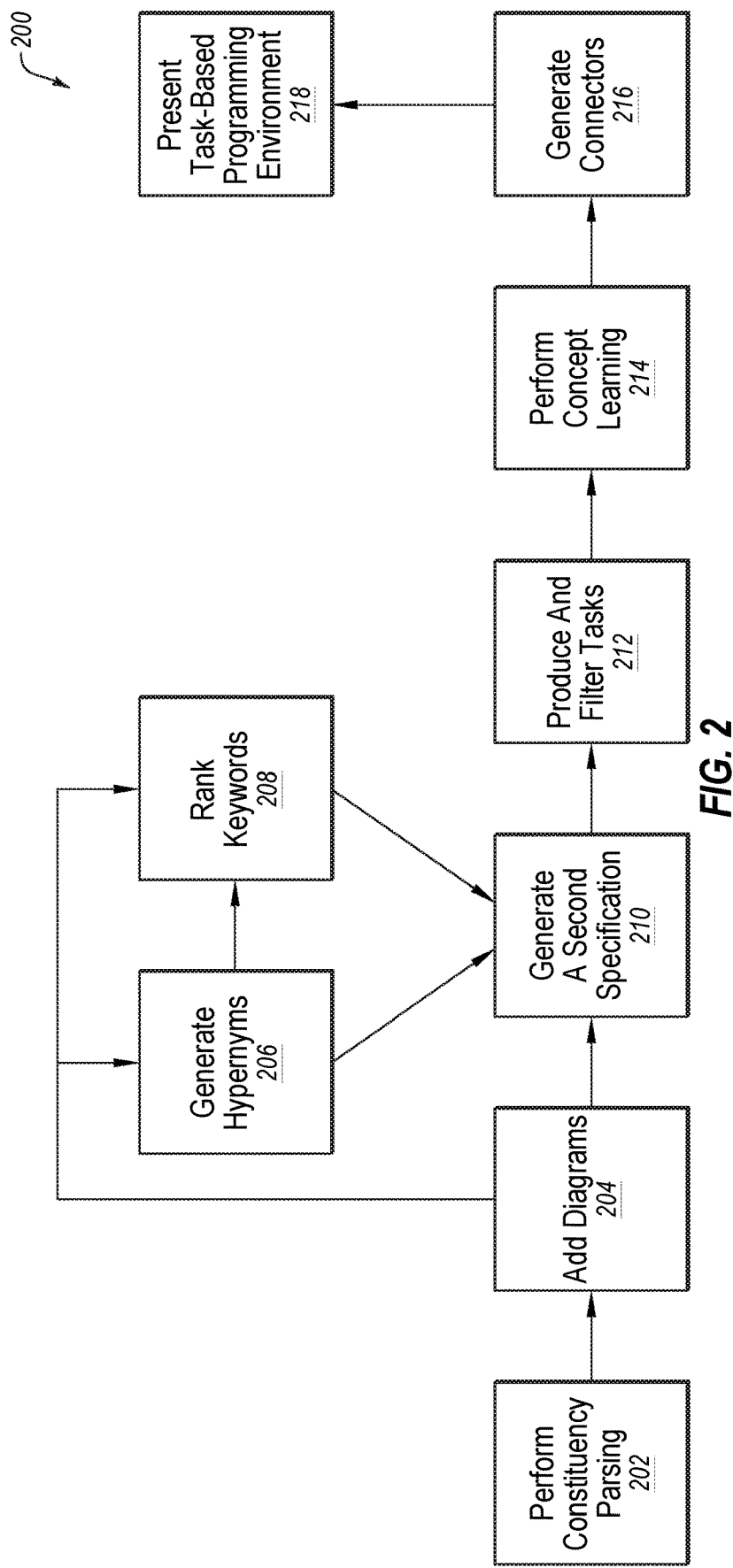
FIG. 2 illustrates a flowchart of an example method to generate a task-based programming environment that may be implemented in the operating environment of FIG. 1.

FIG. 2 illustrates a flowchart of an example method 200 to generate a task-based programming environment that may be implemented by the computing device 102 of FIG. 1, in accordance with at least one embodiment described in the present disclosure. Method 200 may be performed by any suitable system, apparatus, or device with respect to generating the task-based programming environment. For example, the concept mining module 112, the task module 114, and the concept learning module 116 of FIG. 1 may perform or direct performance of one or more of the operations associated with the method 200. Although illustrated with discrete blocks, the steps and operations associated with one or more of the blocks of the method 200 may be divided into additional blocks, combined into fewer blocks, or eliminated, depending on the particular implementation.

The method 200 may include a block 202, at which constituency parsing of descriptions in a first specification may be performed. The constituency parsing may order the words of the different descriptions based on the hierarchy order of word types. In some embodiments, each word may be assigned a priority based on the corresponding word type. The constituency parsing may be performed by the concept mining module 112 of FIG. 1. At block 204, diagrams may be added based on the descriptions. The diagrams may be generated to include each word of the corresponding descriptions. In the diagrams, the words may be arranged based on the indicated priority of the words (e.g., based on the hierarchy order of word types). In these and other embodiments, the diagrams may indicate relationships between the words in the descriptions. The diagrams may be added by the concept mining module 112 of FIG. 1. Block 204 may optionally be followed by block 206 and/or block 208. Block 204 may alternatively be followed by block 210.

At block 206, hypernyms may be generated. In some embodiments, one or more nouns in the description may be extracted. In these and other embodiments, the hypernyms may be determined for each of the extracted nouns. Additionally or alternatively, the hypernyms may replace the corresponding nouns in the description to create a generic description. The hypernyms may be generated by the concept mining module 112 of FIG. 1. At block 208, keywords may be ranked. In some embodiments, keywords may be extracted from each description. The keywords may be associated with an overarching topic of the computation resources. In some embodiments, the keywords may be assigned a ranking based on a position of the keywords in the corresponding diagrams. The keywords may be determined and ranked by the concept mining module 112 of FIG. 1.

At block 210, a second specification may be generated. In some embodiments, the second specification may be generated to include the diagrams. In these and other embodiments, the second specification may be generated to include the generic descriptions and the extracted keywords and corresponding rankings. Additionally or alternatively, the second specification may be generated to include the descriptions and parameters and schema form the first specification. The second specification may correspond to the second specification 108 of FIG. 1. In addition, the second specification may be generated by the concept mining module 112 of FIG. 1. At block 212, tasks may be produced and filtered. In some embodiments, the tasks may be produced (e.g., generated) based on the schema, the description, the parameters, the diagram, the concept keywords and the corresponding rankings, and/or the generic descriptions included in the second specification. In these and other embodiments, each task may be generated so as to be directed to a different functionality of the computation resource. For example, a task may be generated for each input parameter, each output parameters, and each verb in the parameters. Additionally or alternatively, the tasks may be filtered to only include common tasks. In some embodiments, the tasks may be filtered by comparing the tasks to tasks or information (e.g., parameters) of another specification (e.g., the other specification 111 of FIG. 1). In some embodiments, the tasks may be produced and filtered by the task module 114 of FIG. 1.

At block 214, concept learning may be performed. In some embodiments, the concept learning may be performed using the tasks. In these and other embodiments, hierarchy descriptions may be generated for each task. Each hierarchy description may describe the corresponding task at a different layer of functionality. In addition, hierarchy models may be generated for each task. The hierarchy models may include the hierarchy descriptions arranged based on breadth of the corresponding level of functionality. For example, a broadest functionality hierarchy description may be assigned a highest position in the corresponding hierarchy model and a narrowest functionality hierarchy description may be assigned a lowest position in the corresponding hierarchy model. The concept learning may be performed by the concept learning module 116 of FIG. 1. In some embodiments, the hierarchy descriptions may be presented via a device. In these and other embodiments, the hierarchy descriptions may be presented to a SE user based on the hierarchy models. For example, a corresponding broadest functionality hierarchy description may initially be presented for each task. A GUI may permit the SE user to drill down into the hierarchy descriptions to access different layers of functionality. In addition, the GUI may permit the SE user to select different tasks (e.g., different hierarchy descriptions) to include as part of the task-based programming environment.

At block 216, connectors may be generated. The connectors may be generated to connect different aspects of the selected tasks. For example, the connectors may be generated to connect different fields that may be populated based on the same or similar input parameters. The connectors may associate the different selected tasks in a manner to create the task-based environment as a cohesive environment that automatically populates related fields based on a single input parameter rather than obtaining the input parameter repeatedly for each field. At block 218, the task-based programming environment may be presented. In some embodiments, the task-based programming environment may be presented to another user via an additional GUI.

Modifications, additions, or omissions may be made to the method 200 without departing from the scope of the present disclosure. For example, the operations of method 200 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the described embodiments.

Figure 3:
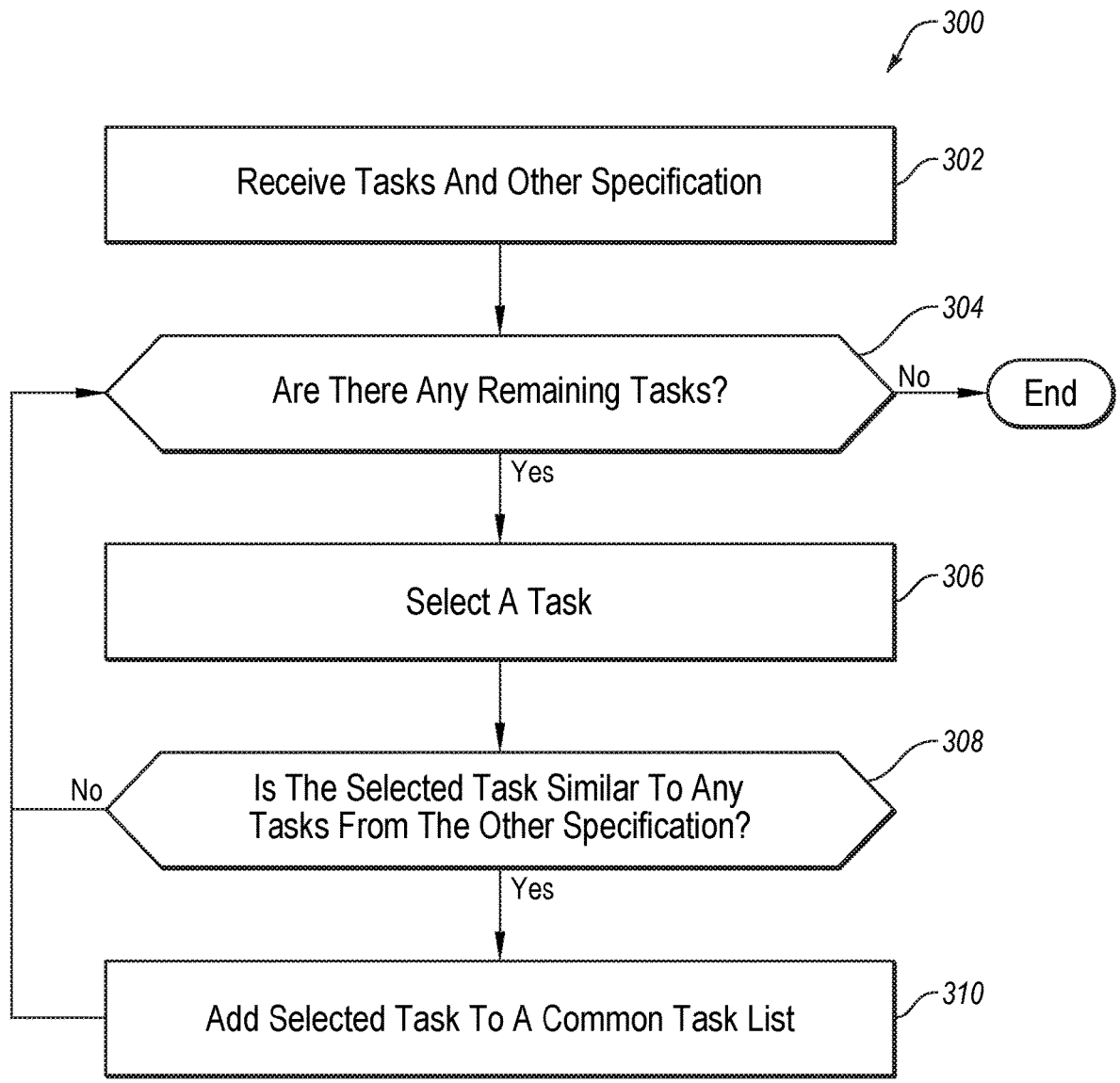
FIG. 3 illustrates a flowchart of an example method to generate a common task list that may be implemented in the operating environment of FIG. 1.

FIG. 3 illustrates a flowchart of an example method 300 to generate a common task list that may be implemented by the computing device 102 of FIG. 1, in accordance with at least one embodiment described in the present disclosure. The method 300 may be performed by any suitable system, apparatus, or device with respect to selecting one or more tasks to be added to the common task list. For example, the task module 114 of FIG. 1 may perform or direct performance of one or more of the operations associated with the method 300. Although illustrated with discrete blocks, the steps and operations associated with one or more of the blocks of the method 300 may be divided into additional blocks, combined into fewer blocks, or eliminated, depending on the particular implementation.

The method 300 may include a block 302, at which tasks and another specification may be received. The tasks may be generated as discussed above in relation to FIGS. 1 and 2. Each task may be directed to a different level of functionality of the various computation resources in a specification (e.g., the first specification 109 of FIG. 1). The other specification (e.g., an additional resource specification such as the other specification 111 of FIG. 1) may include multiple computation resources and/or information describing various tasks associated with a different resource. Various features (e.g., different tasks, parameters, and/or schema) may be extracted from the other specification. In some embodiments, the tasks of the other specification may be generated by comparing the extracted features to a task database.

At block 304, it may be determined whether there are any remaining tasks. In some embodiments, it may be determined whether there are any tasks that have not been compared to tasks and/or information from the other specification. If there are remaining tasks, block 304 may be followed by block 306. If there are not any remaining tasks, the method 300 may end.

At block 306, a task may be selected. The task may be a remaining task that was generated based on a first specification. At block 308, it may be determined if the selected task is similar to any tasks from the other specification. In some embodiments, a task description of the selected task may be compared to the descriptions of the tasks in the other specification. In other embodiments, parameters of the selected task may be compared to the parameters of the tasks in the other specification. If the selected task is similar to one or more tasks from the other specification, block 308 may be followed by block 310. If the selected task is not similar to one or more tasks from the other specification, block 308 may be followed by block 304.

At block 310, the selected task may be added to a common task list. In some embodiments, the common task list may be referred to as a task list. In these and other embodiments, the selected task may be added to the common task list based on a number of similarities between the selected task and the tasks of the other specification. Block 310 may be followed by block 304. Blocks 304, 306, 308, and 310 may be repeated until each task has been compared to a tasks and/or information in the other specification.

Modifications, additions, or omissions may be made to the method 300 without departing from the scope of the present disclosure. For example, the operations of method 300 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the described embodiments.

Figure 4:
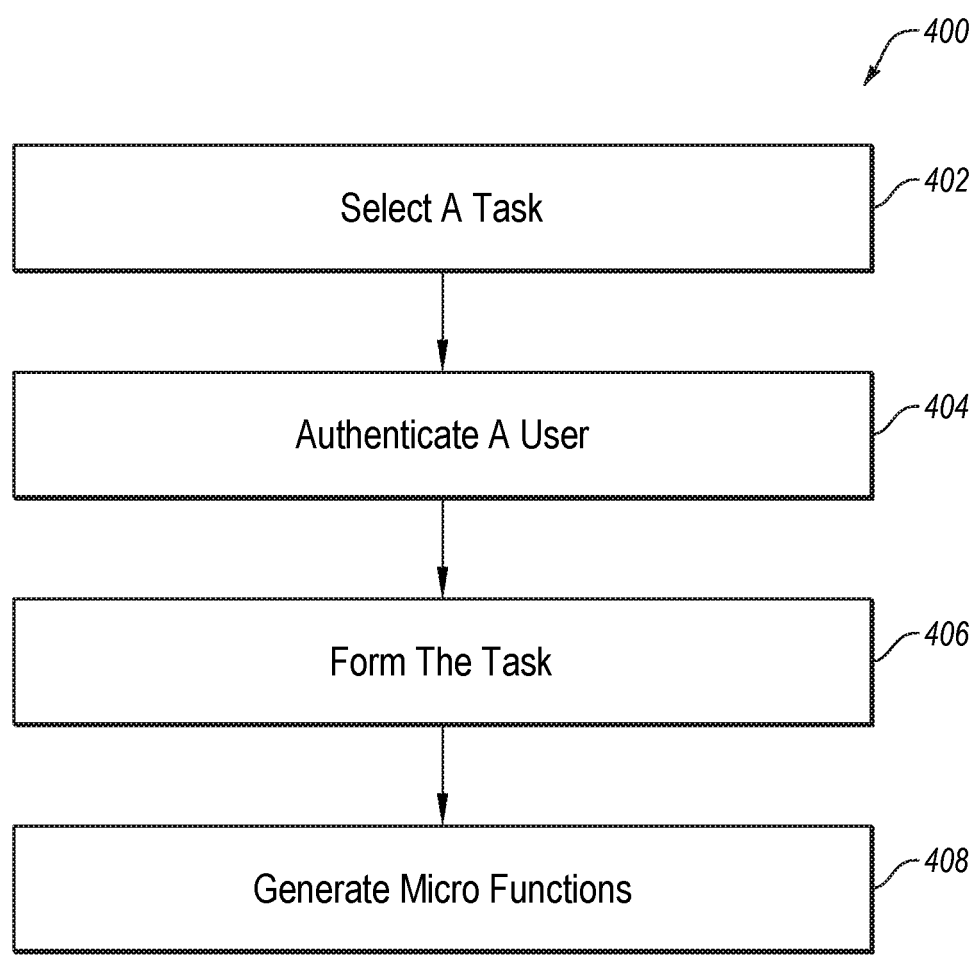
FIG. 4 illustrates a flowchart of an example method to generate micro functions that may be implemented in the operating environment of FIG. 1.

FIG. 4 illustrates a flowchart of an example method 400 to generate micro functions that may be implemented by the computing device 102 of FIG. 1, in accordance with at least one embodiment described in the present disclosure. Method 400 may be performed by any suitable system, apparatus, or device with respect. For example, the concept learning module 116 of FIG. 1 may perform or direct performance of one or more of the operations associated with the method 400. Although illustrated with discrete blocks, the steps and operations associated with one or more of the blocks of the method 400 may be divided into additional blocks, combined into fewer blocks, or eliminated, depending on the particular implementation.

The method 400 may include a block 402, at which a task may be selected. In some embodiments, the task may be selected by as SE user to be included in a task-based programming environment. At block 404, the user (e.g., the SE user) may be authenticated. In some embodiments, authenticating the SE user may permit the SE user to access to the connector generator and data within the connector generator. In these and other embodiments, authenticating the SE user may permit the SE user to access resources and information maintained by different entities.

At block 406, the task may be formed. In some embodiments, the SE user may select multiple tasks to be included in a sequence of tasks. In addition, the SE user may provide one or more parameters for the various tasks. The parameters may be used to populate various fields in the tasks. In addition, connections (e.g., connectors) between the different tasks may be generated. The connectors may associate various fields (e.g., parameters) within the different tasks with each other. At block 408, the micro functions may be generated. The micro functions may include code and data for actually performing the various tasks. The code may associate the data based on the selected tasks and connectors.

Modifications, additions, or omissions may be made to the method 400 without departing from the scope of the present disclosure. For example, the operations of method 400 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the described embodiments.

FIG. 5 illustrates a screen shot 500 of an example second specification that may be implemented in the operating environment 100 of FIG. 1, in accordance with at least one embodiment described in the present disclosure. As illustrated in FIG. 5, the example second specification 500 includes concept keywords 520 and corresponding rankings 518. In FIG. 5, a single concept keyword is denoted as 520 to illustrate an example concept keyword. In addition, in FIG. 5, a single ranking is denoted as 518 to illustrate an example concept keyword ranking.

FIG. 6 illustrates a screen shot 600 of example tasks 622, 624 that may be generated by the computing device 102 of FIG. 1, in accordance with at least one embodiment described in the present disclosure. As illustrated in FIG. 6, each task 622, 624 may include a name (e.g., a task description) and multiple parameters. The parameters may indicate associated fields such as input, name, if the parameter is required, type, etc.

Figure 7:
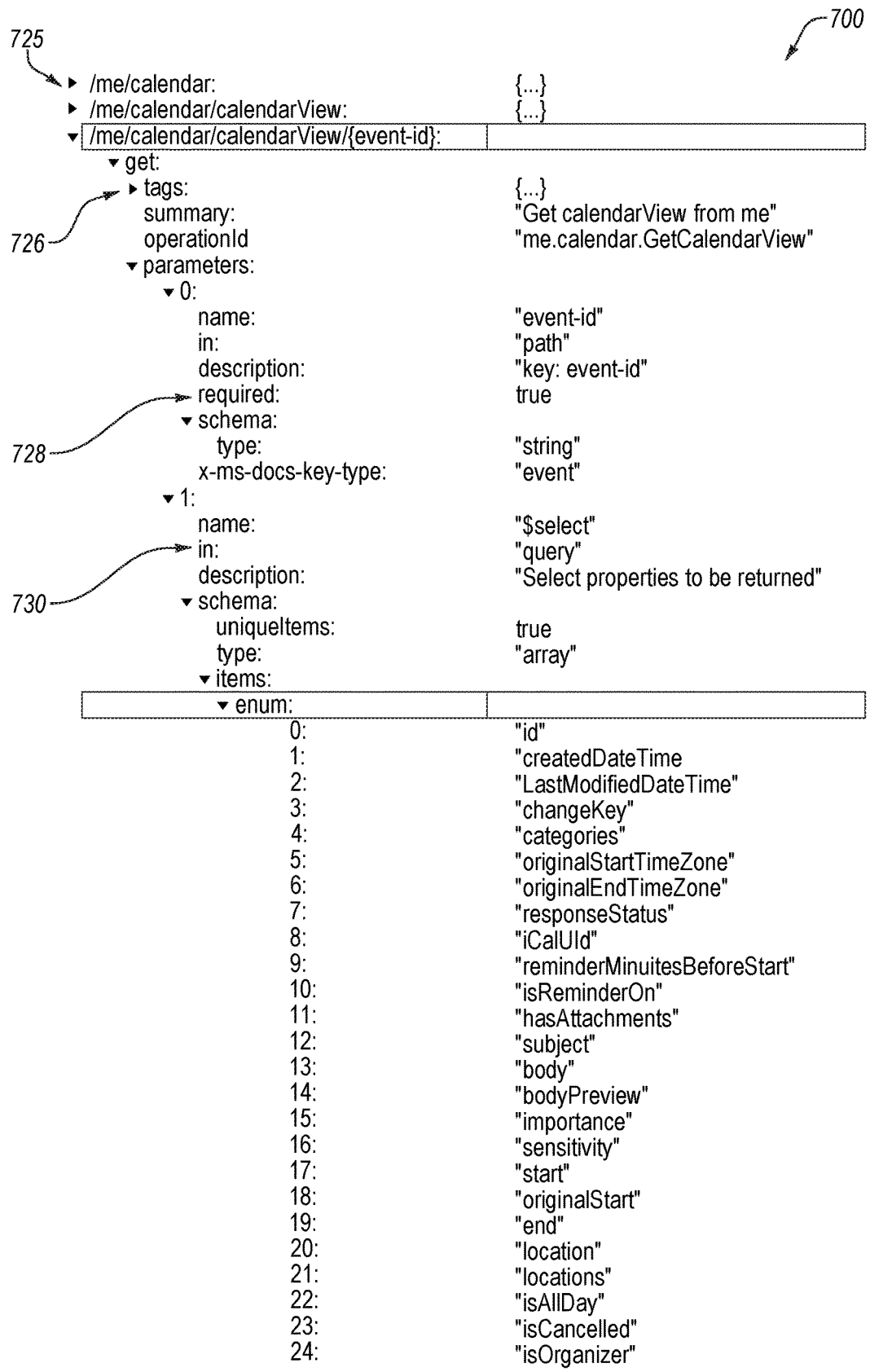
FIG. 7 illustrates a screen shot of example computation resources that may be implemented in the environment of FIG. 1.

FIG. 7 illustrates a screen shot 700 of example computation resources 725 that may be implemented in the environment 100 of FIG. 1, in accordance with at least one embodiment described in the present disclosure. In FIG. 7 a single computation resource (e.g., /me/calendar/calendarView/{event-id}) is expanded to illustrate different parameters 728, 730 and computation resource calls 726. In some embodiments, tasks may be generated for each different parameter (e.g., input parameters 728 and output parameters 730) and each computation resource call 726. For example, tasks may be generated for functionalities of the computation resource (e.g., different tasks for the computation resource calls). In these and other embodiments, tasks may be generated for each input parameter 728 and each output parameter 730.

FIG. 8 illustrates a screen shot 800 of an example task schema that may be implemented by the computing device 102 of FIG. 1, in accordance with at least one embodiment described in the present disclosure. As illustrated in FIG. 8, the task schema 800 may include a semantic description 832 that is constructed by performing constituency parsing. In addition, the task schema 800 may include task-based parameters 834 that are filtered from the first specification. Further, the task schema may include task-based schema 836 that are also filtered from the first specification.

Figure 9:
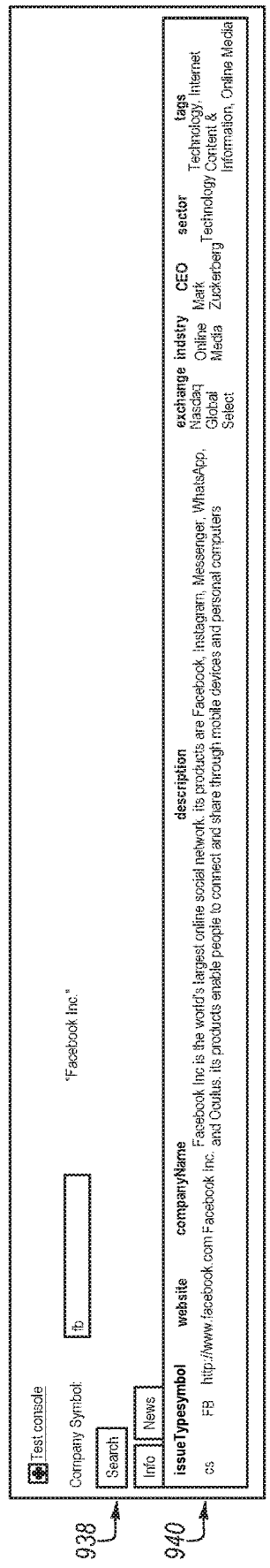
FIG. 9 illustrates a screen shot of an example graphical user interface (GUI) that includes a search field and a result field that may be displayed via the display screen of FIG. 1.

FIG. 9 illustrates a screen shot 900 of an example GUI that includes a search field 938 and a result field 940 that may be displayed via the display screen 110 of FIG. 1, in accordance with at least one embodiment described in the present disclosure. The GUI 900 may be implemented as part of the task-based programming environment. The search field 938 may be implemented to permit the user to search for different resources (e.g., "fb"). The result field 940 may be populated based on the search performed using the search field 938.

Figure 10:
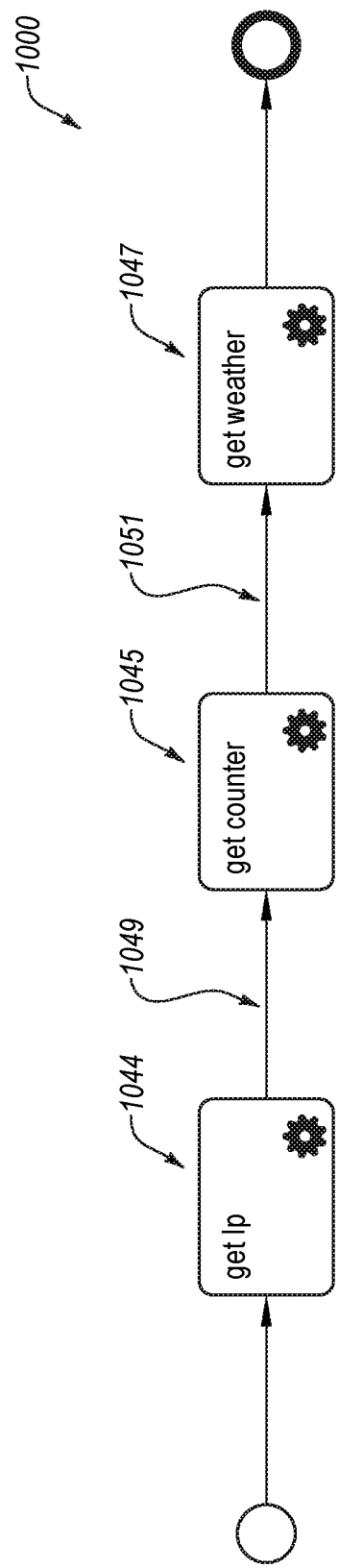
FIG. 10 illustrates a screen shot of an example GUI that includes a sequence of tasks that may be displayed via the display screen of FIG. 1.

FIG. 10 illustrates a screen shot 1000 of an example GUI that includes a sequence of tasks 1044, 1045, 1047 that may be displayed via the display screen 110 of FIG. 1, in accordance with at least one embodiment described in the present disclosure. The SE user may select the different tasks 1044, 1045, 1047 and place them in a particular order. Different connectors 1049, 1051 may be generated to connect the different tasks 1044, 1045, 1047. For example a first connecter may connect task 1044 with task 1045 and a second connector may connect task 1045 with task 1047. The connectors may include code that indicates different fields in the tasks 1044, 1045, 1047 that may be populated using a single parameter.

Figure 11:
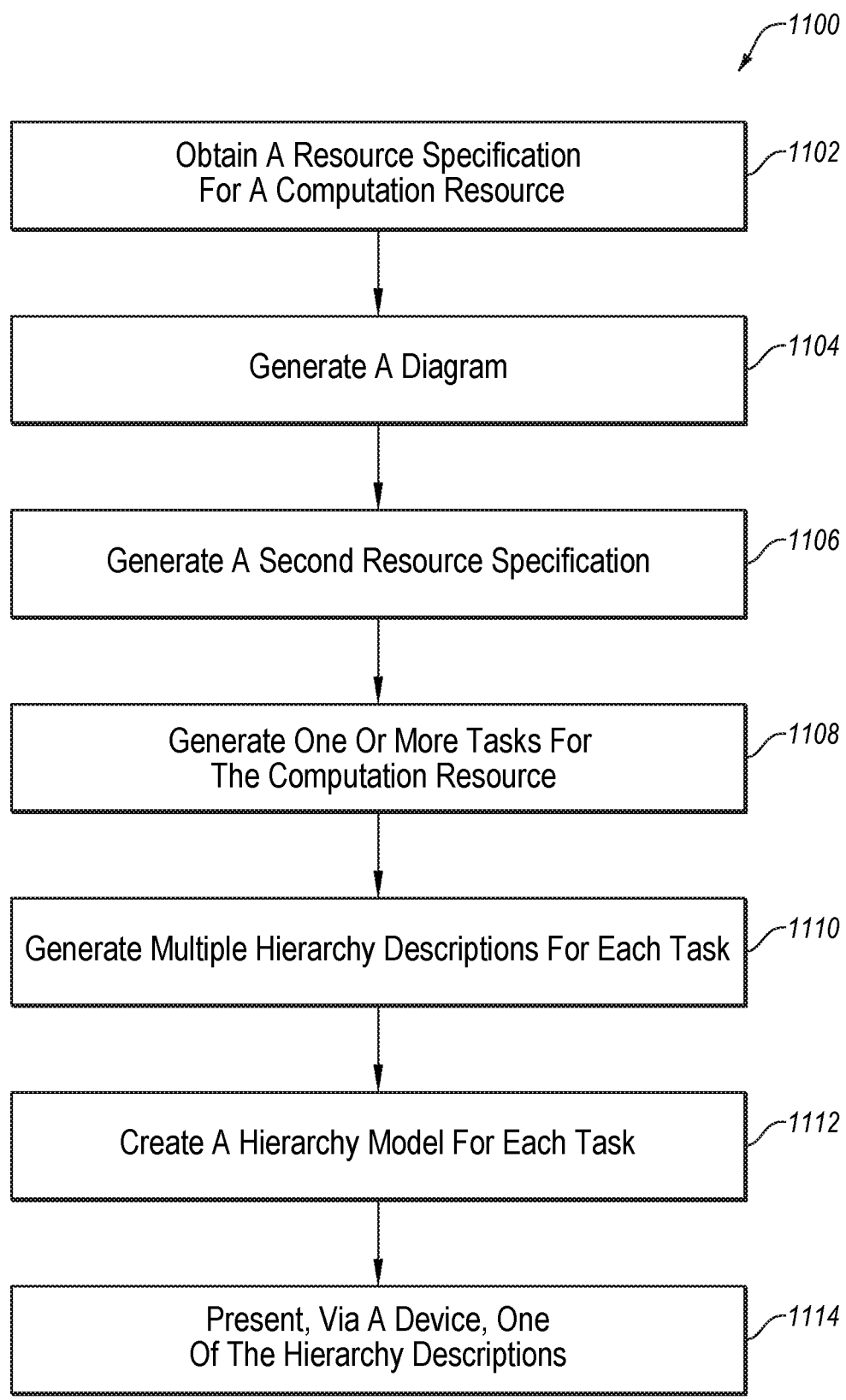
FIG. 11 illustrates a flowchart of an example method to present a hierarchy description for a task.

FIG. 11 illustrates a flowchart of an example method 1100 to present a hierarchy description for a task, in accordance with at least one embodiment described in the present disclosure. The method 1100 may be performed by any suitable system, apparatus, or device with respect to. For example, the concept mining module 112, the task module 114, or the concept learning module 116 of FIG. 1 may perform or direct performance of one or more of the operations associated with the method 1100. Although illustrated with discrete blocks, the steps and operations associated with one or more of the blocks of the method 1100 may be divided into additional blocks, combined into fewer blocks, or eliminated, depending on the particular implementation.

The method 1100 may include a block 1102, at which a resource specification for a computation resource may be obtained. For example, the first specification 109 of FIG. 1 may be obtained. In some embodiments, the resource specification may include a description of how the computation resource operates and how the computation resource interacts with an additional computation resource. At block 1104, a diagram may be generated. In some embodiments, the diagram may include each word in the description arranged in a hierarchy order of word types. In these and other embodiments, the diagram may indicate relationships between the words.

At block 1106, a second resource specification may be generated. For example, the second specification 108 of FIG. 1 may be generated. In some embodiments, the second resource specification may include the description and the diagram. At block 1108, one or more tasks for the computation resource may be generated. In some embodiments, each task may include a task description based on the description of the computation resource and the diagram. At block 1110, multiple hierarchy descriptions for each task may be generated. The hierarchy descriptions may be generated based on the task description for each corresponding task. At block 1112, a hierarchy model for each task may be created. In some embodiments, each hierarchy model may include the hierarchy descriptions for the corresponding task arranged according to the diagram in the second resource specification. At block 1114, one of the hierarchy descriptions may be presented via a device. In some embodiments, the hierarchy description may be presented according to the hierarchy models.

Modifications, additions, or omissions may be made to the method 1100 without departing from the scope of the present disclosure. For example, the operations of method 1100 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the described embodiments.

Figure 12:
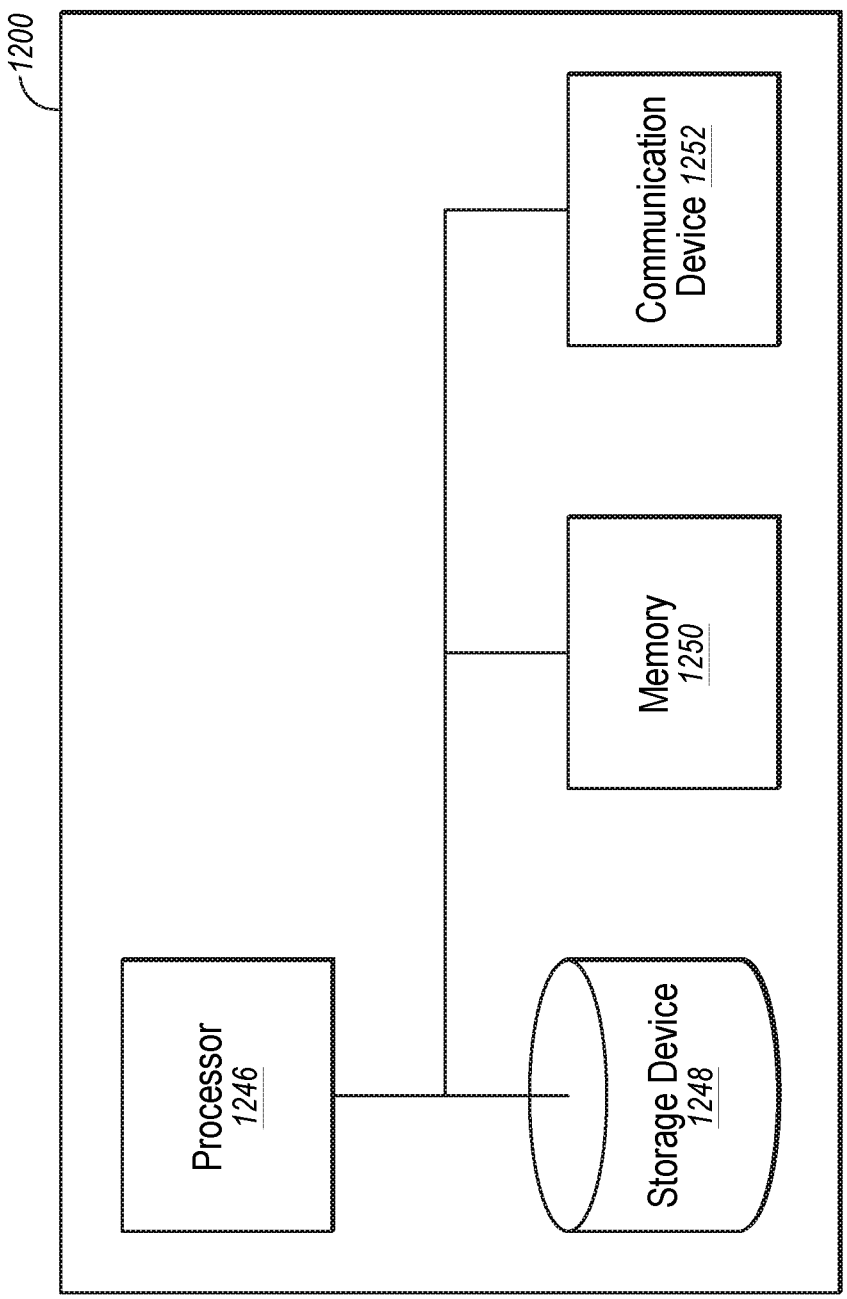
FIG. 12 is a block diagram of the example computing system, all according to at least one embodiment described in the present disclosure.

FIG. 12 is a block diagram of the example computing system 1200. The computing system 1200 may include a desktop computer, a laptop computer, a server computer, a tablet computer, a mobile phone, a smartphone, a personal digital assistant (PDA), an e-reader device, a network switch, a network router, a network hub, other networking devices, or other suitable computing device.

The computing system 1200 may include a processor 1246, a storage device 1248, a memory 1250, and a communication device 1252. The processor 1246, the storage device 1248, the memory 1250, and/or the communication device 1252 may all be communicatively coupled such that each of the components may communicate with the other components. The computing system 1200 may perform any of the operations described in the present disclosure.

In general, the processor 1246 may include any suitable special-purpose or general-purpose computer, computing entity, or processing device including various computer hardware or software modules and may be configured to execute instructions stored on any applicable computer-readable storage media. For example, the processor 1246 may include a microprocessor, a microcontroller, a digital signal processor (DSP), an application-specific integrated circuit (ASIC), a Field-Programmable Gate Array (FPGA), or any other digital or analog circuitry configured to interpret and/or execute program instructions and/or to process data. Although illustrated as a single processor in FIG. 12, the processor 1246 may include any number of processors configured to perform, individually or collectively, any number of operations described in the present disclosure.

In some embodiments, the processor 1246 may interpret and/or execute program instructions and/or process data stored in the storage device 1248, the memory 1250, or the storage device 1248 and the memory 1250. In some embodiments, the processor 1246 may fetch program instructions from the storage device 1248 and load the program instructions in the memory 1250. After the program instructions are loaded into the memory 1250, the processor 1246 may execute the program instructions.

For example, in some embodiments, one or more of the processing operations for the concept mining module 112, the task module 114, and/or the concept learning module 116 may be included in the storage device 1248 as program instructions. The processor 1246 may fetch the program instructions of one or more of the processing operations and may load the program instructions of the processing operations in the memory 1250. After the program instructions of the processing operations are loaded into the memory 1250, the processor 1246 may execute the program instructions such that the computing system 1200 may implement the operations associated with the processing operations as directed by the program instructions.

The storage device 1248 and the memory 1250 may include computer-readable storage media for carrying or having computer-executable instructions or data structures stored thereon. Such computer-readable storage media may include any available media that may be accessed by a general-purpose or special-purpose computer, such as processor 1246. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 1246 to perform a certain operation or group of operations.

In some embodiments, the storage device 1248 and/or the memory 1250 may store data associated with generating a second specification and/or a task-based programming environment. For example, the storage device 1248 and/or the memory 1250 may store specifications, task lists, parameters, descriptions, and/or schemas.

The communication device 1252 may include any device, system, component, or collection of components configured to allow or facilitate communication between the computing system 1200 and another electronic device. For example, the communication device 1252 may include, without limitation, a modem, a network card (wireless or wired), an infrared communication device, an optical communication device, a wireless communication device (such as an antenna), and/or chipset (such as a Bluetooth device, an 802.6 device (e.g., Metropolitan Area Network (MAN)), a Wi-Fi device, a WiMAX device, cellular communication facilities, etc.), and/or the like. Communication device 1252 may permit data to be exchanged with any network such as a cellular network, a Wi-Fi network, a MAN, an optical network, etc., to name a few examples, and/or any other devices described in the present disclosure, including remote devices.

Modifications, additions, or omissions may be made to FIG. 12 without departing from the scope of the present disclosure. For example, the computing system 1200 may include more or fewer elements than those illustrated and described in the present disclosure. For example, the computing system 1200 may include an integrated display device such as a screen of a tablet or mobile phone or may include an external monitor, a projector, a television, or other suitable display device that may be separate from and communicatively coupled to the computing system 1200.

Embodiments described in the present disclosure may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data, which cause a general-purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

As used in the present disclosure, terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method comprising:
   obtaining a resource specification for a computation resource, the resource specification includes a description of how the computation resource operates and how the computation resource interacts with another computation resource;
   generating a diagram that includes each word in the description arranged in a hierarchy order of word types, the diagram indicating relationships between the words;
   generating a second resource specification that includes the description and the diagram;
   generating one or more tasks for the computation resource, wherein each task of the one or more tasks includes a task description based on the description of the computation resource and the diagram;
   generating a plurality of hierarchy descriptions for each task of the one or more tasks based on the task description for each corresponding task;
   creating a hierarchy model for each task of the one or more tasks, each hierarchy model includes the plurality of hierarchy descriptions for the corresponding task arranged according to the diagram in the second resource specification; and
   presenting, via a device, one of the hierarchy descriptions of the plurality of hierarchy descriptions for the one or more tasks according to the hierarchy models.

2. The method of claim 1, wherein the one or more tasks includes two or more tasks, the method further comprising:
   comparing the two or more tasks to at least one task in an additional resource specification; and
   arranging the two or more tasks in a commonality order based on a similarity between each task of the one or more tasks and one or more tasks in the additional resource specification, wherein the hierarchy descriptions for the two or more tasks are displayed, via the device, according to the commonality order.

3. The method of claim 2, wherein the comparing the two or more tasks to one or more tasks in the additional resource specification comprises:
receiving the additional resource specification;
extracting one or more features from the additional resource specification; and
generating the tasks in the additional resource specification by comparing the one or more features to a task database.

4. The method of claim 1 further comprising generating code for a micro function based on one or more hierarchy descriptions of the plurality of hierarchy descriptions and the code for the micro function is configured to cause the device to perform one or more corresponding tasks.

5. The method of claim 1 further comprising:
identifying a plurality of concept keywords in the description; and
determining a ranking of each concept keyword of the plurality of concept keywords, wherein the diagram in the second resource specification further includes the plurality of concept keywords and the ranking of each concept keyword and each hierarchy model includes the plurality of hierarchy descriptions according to a corresponding ranking of the concept keywords in the diagram.

6. The method of claim 1 further comprising:
determining a hypernym for each noun in the description; and
generating a generic description for the computation resource, wherein in the generic description each noun is replaced with a corresponding hypernym and the second resource specification further includes the generic description and the task description for each task of the one or more tasks is further based on the generic description.

7. The method of claim 1, wherein the generating one or more tasks for the computation resource comprises:
identifying one or more tasks for one or more functionalities of the computation resource;
identifying one or more tasks for one or more input parameters of the computation resource; and
identifying one or more tasks for one or more output parameters of the computation resource.

8. A non-transitory computer-readable medium having computer-readable instructions stored thereon that are executable by a processor to perform or control performance of operations comprising:
obtaining a resource specification for a computation resource, the resource specification includes a description of how the computation resource operates and how the computation resource interacts with another computation resource;
generating a diagram that includes each word in the description arranged in a hierarchy order of word types, the diagram indicating relationships between the words;
generating a second resource specification that includes the description and the diagram;
generating one or more tasks for the computation resource, wherein each task of the one or more tasks includes a task description based on the description of the computation resource and the diagram;
generating a plurality of hierarchy descriptions for each task of the one or more tasks based on the task description for each corresponding task;
creating a hierarchy model for each task of the one or more tasks, each hierarchy model includes the plurality of hierarchy descriptions for the corresponding task arranged according to the diagram in the second resource specification; and
presenting, via a device, one of the hierarchy descriptions of the plurality of hierarchy descriptions for the one or more tasks according to the hierarchy models.

9. The non-transitory computer-readable medium of claim 8, wherein the one or more tasks includes two or more tasks, the operations further comprising:
comparing the two or more tasks to at least one task in an additional resource specification; and
arranging the two or more tasks in a commonality order based on a similarity between each task of the one or more tasks and one or more tasks in the additional resource specification, wherein the hierarchy descriptions for the two or more tasks are displayed, via the device, according to the commonality order.

10. The non-transitory computer-readable medium of claim 9, wherein the operation comparing the two or more tasks to one or more tasks in the additional resource specification comprises:
receiving the additional resource specification;
extracting one or more features from the additional resource specification; and
generating the tasks in the additional resource specification by comparing the one or more features to a task database.

11. The non-transitory computer-readable medium of claim 8, the operations further comprising generating code for a micro function based on one or more hierarchy descriptions of the plurality of hierarchy descriptions and the code for the micro function is configured to cause the device to perform one or more corresponding tasks.

12. The non-transitory computer-readable medium of claim 8, the operations further comprising:
identifying a plurality of concept keywords in the description; and
determining a ranking of each concept keyword of the plurality of concept keywords, wherein the diagram in the second resource specification further includes the plurality of concept keywords and the ranking of each concept keyword and each hierarchy model includes the plurality of hierarchy descriptions according to a corresponding ranking of the concept keywords in the diagram.

13. The non-transitory computer-readable medium of claim 8, the operations further comprising:
determining a hypernym for each noun in the description; and
generating a generic description for the computation resource, wherein in the generic description each noun is replaced with a corresponding hypernym and the second resource specification further includes the generic description and the task description for each task of the one or more tasks is further based on the generic description.

14. The non-transitory computer-readable medium of claim 8, wherein the operation generating one or more tasks for the computation resource comprises:
identifying one or more tasks for one or more functionalities of the computation resource;
identifying one or more tasks for one or more input parameters of the computation resource; and
identifying one or more tasks for one or more output parameters of the computation resource.

15. A system comprising:
one or more computer-readable storage media configured to store instructions; and
one or more processors communicatively coupled to the one or more computer-readable storage media and configured to, in response to execution of the instructions, cause the system to perform operations, the operations comprising:
- obtaining a resource specification for a computation resource, the resource specification includes a description of how the computation resource operates and how the computation resource interacts with an additional computation resource;
- generating a diagram that includes each word in the description arranged in a hierarchy order of word types, the diagram indicating relationships between the words;
- generating a second resource specification that includes the description and the diagram;
- generating one or more tasks for the computation resource, wherein each task of the one or more tasks includes a task description based on the description of the computation resource and the diagram;
- generating a plurality of hierarchy descriptions for each task of the one or more tasks based on the task description for each corresponding task;
- creating a hierarchy model for each task of the one or more tasks, each hierarchy model includes the plurality of hierarchy descriptions for the corresponding task arranged according to the diagram in the second resource specification; and
- presenting, via a device, one of the hierarchy descriptions of the plurality of hierarchy descriptions for the one or more tasks according to the hierarchy models.

16. The system of claim 15, wherein the one or more tasks includes two or more tasks, the operations further comprising:
- comparing the two or more tasks to at least one task in an additional resource specification; and
- arranging the two or more tasks in a commonality order based on a similarity between each task of the one or more tasks and one or more tasks in the additional resource specification, wherein the hierarchy descriptions for the two or more tasks are displayed, via the device, according to the commonality order.

17. The system of claim 16, wherein the operation comparing the two or more tasks to one or more tasks in the additional resource specification comprises:
- receiving the additional resource specification;
- extracting one or more features from the additional resource specification; and
- generating the tasks in the additional resource specification by comparing the one or more features to a task database.

18. The system of claim 15, the operations further comprising generating code for a micro function based on one or more hierarchy descriptions of the plurality of hierarchy descriptions and the code for the micro function is configured to cause the device to perform one or more corresponding tasks.

19. The system of claim 15, the operations further comprising:
- identifying a plurality of concept keywords in the description; and
- determining a ranking of each concept keyword of the plurality of concept keywords, wherein the diagram in the second resource specification further includes the plurality of concept keywords and the ranking of each concept keyword and each hierarchy model includes the plurality of hierarchy descriptions according to a corresponding ranking of the concept keywords in the diagram.

20. The system of claim 15, wherein the operation generating one or more tasks for the computation resource comprises:
- identifying one or more tasks for one or more functionalities of the computation resource;
- identifying one or more tasks for one or more input parameters of the computation resource; and
- identifying one or more tasks for one or more output parameters of the computation resource.

* * * * *